Sept. 15, 1925
B. M. SHORT
AUTOMOBILE BUMPER
Filed Jan. 9, 1924
1,553,562
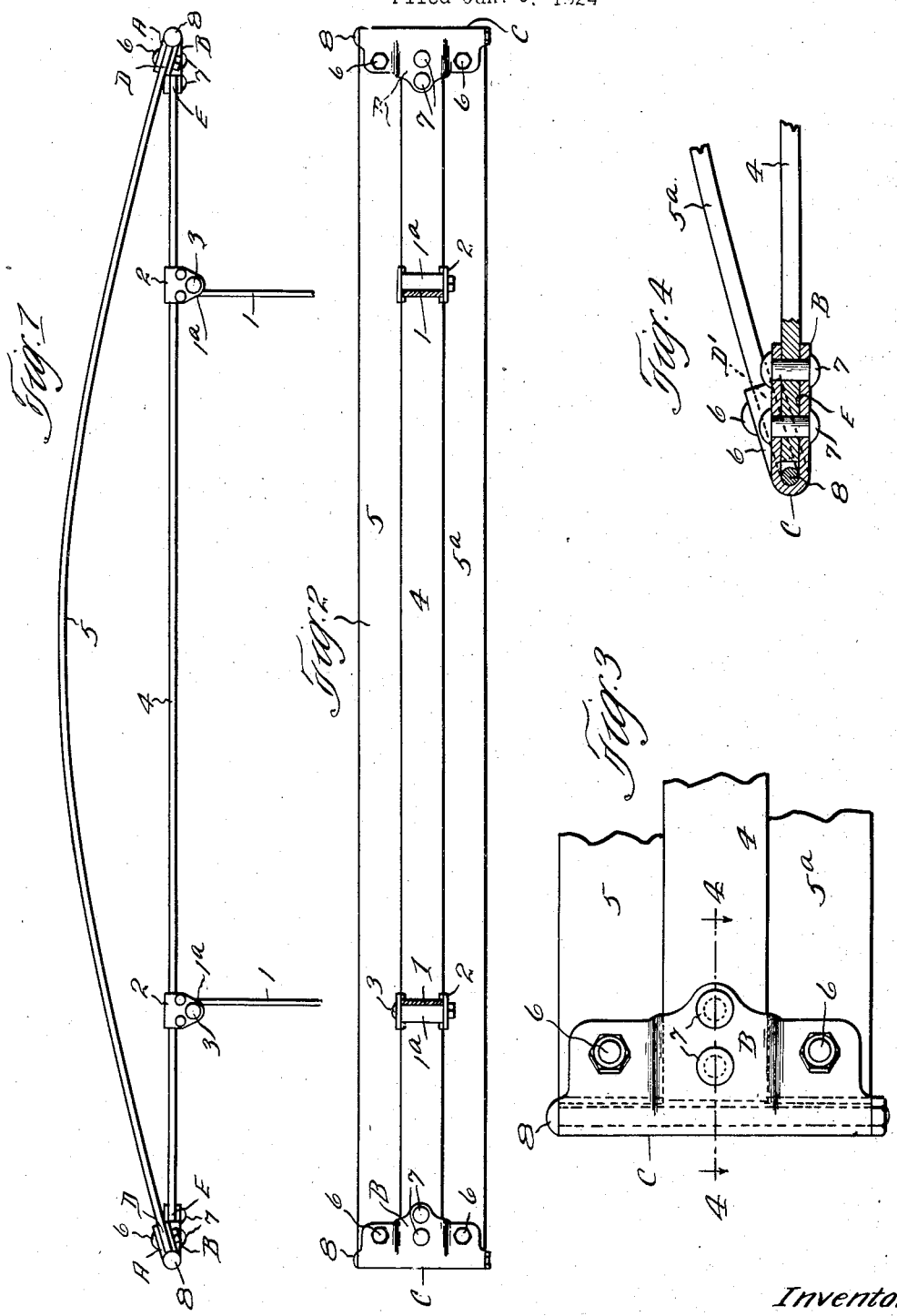
Inventor
Bladen M. Short,
By Hull, Buck & West
Attys.

Patented Sept. 15, 1925.

1,553,562

UNITED STATES PATENT OFFICE.

BLADEN M. SHORT, OF DETROIT, MICHIGAN, ASSIGNOR TO THE C. G. SPRING & BUMPER COMPANY, OF DETROIT, MICHIGAN, A CORPORATION OF DELAWARE.

AUTOMOBILE BUMPER.

Application filed January 9, 1924. Serial No. 685,132.

*To all whom it may concern:*

Be it known that I, BLADEN M. SHORT, a citizen of the United States, residing at Detroit, in the county of Wayne and State of Michigan, have invented a certain new and useful Improvement in Automobile Bumpers, of which the following is a full, clear, and exact description, reference being had to the accompanying drawings.

This invention relates to bumpers for automobiles or similar vehicles and has for its general object to provide a bumper of this type which is extremely efficient in operation and which is nevertheless capable of economical production. Further and more limited objects of the invention will be set forth in the specification and will be realized in and through the combinations of elements and arrangement of parts covered by the claims hereof.

In the drawings Fig. 1 represents a plan view of a bumper constructed in accordance with my invention, together with portions of the supporting arms therefor; Fig. 2 a rear elevation of such bumper, the supporting arms being shown in section; Fig. 3 a detail in elevation of one of the ends of the bumper; and Fig. 4 a detail in section corresponding to the line 4—4 of Fig. 3.

So far as I am advised, it has been the practice, in constructing bumpers having convex or "cambered" impact bars or sections, to secure this convexity or cambering effect by forming the bars or plates, while heated. In building a bumper in accordance with my invention, the front or impact bar or bars are made considerably longer than the rear or auxiliary bar or bars, according to the convexity or camber desired, and the impact bar or bars are given an operating shape by being bent until their ends are brought into substantial alignment with the ends of the rear or auxiliary bars, the ends then being connected. The bumper thus produced is in the form of a strung bow in which the rear or auxiliary bar corresponds to the bow string and the front or impact bar or bars to the bow itself.

A bumper constructed in this manner is cheap of production and is extremely efficient in operation. The front or impact bar or bars being placed under an initial bend or strain in a negative direction (that is to say, in a direction reverse to that which will be imparted to them by impact) will be capable of receiving a much greater deflection than would be otherwise possible before exceeding the elastic limit.

Certain other advantages and capabilities of my invention will be discussed hereinafter in connection with the drawing.

Describing by reference characters the embodiment of my invention disclosed herein, 1, 1 denote bumper supporting arms which are adapted to be secured to the side members (not shown) of an automobile or similar vehicle. A clamp 2 is shown as secured to the adjacent end of each of the arms 1 by means of a vertical pivot bolt 3, extending through an eye $1^a$ on the adjacent end of such arm, the clamps being secured to the rear or auxiliary bar 4 of the bumper. The ends of the bar 4 are connected to the ends of the front or impact bars 5, $5^a$ in any convenient manner, the connecting means shown herein comprising a pair of connecting members, one for each end of the bumper assembly, one of which members will now be described. Each connecting member comprises generally a stamping having upper and lower pockets for the ends of the bars 5 and $5^a$ respectively, and an intermediate pocket for the corresponding end of the bar 4. The upper and lower pockets preferably form an angle with the intermediate pocket in order to receive conveniently therewithin the ends of the upper and lower bars, which are converging toward the corresponding end of the intermediate bar. Each such connecting member comprises generally a front plate A and a rear plate B united by a rounded hollow edge C. The upper forwardly projecting pockets are indicated at D on Fig. 1 and the lower forwardly projecting pocket at D' on Fig. 4. It will be noted that these pockets are formed between parallel forwardly projecting portions of the front and rear walls of the connecting members. The intermediate pockets are indicated at E (see Figs. 1 and 4), and these pockets receive and constitute in effect extensions of the bar 4.

In assembling, the bars 5 and $5^a$ are bent until their ends are substantially in line with the corresponding ends of the bar 4, and the ends of the bars 4, 5 and $5^a$ are inserted into their appropriate pockets in the connecting members. The bars 5 and $5^a$ are preferably secured in place in their pockets by means of the machine bolts 6 while the ends of the intermediate bar are preferably secured in place by means of rivets 7. Between the ends of the bars 4, 5 and 5ª and the rounded edge C of the corresponding connecting member, a vertical bore or space is provided within which a bolt 8 may be inserted.

A bumper constructed in accordance with my invention is extremely efficient in operation and can be assembled in such manner as will adapt it for greatly varying conditions of use. For instance, it is possible to design a bumper wherein certain stresses can be imposed upon certain parts (either the front or the back bars) of the bumper so as to equalize the stresses resulting from collision or bending, as well as to equalize the thickness of the material employed in the front and back bars.

A still further advantage of my invention is that because of the fact that the parts, when assembled, are under stress, rattling of the parts will be prevented.

Having thus described my invention, what I claim is:—

1. A bumper comprising a front or impact bar and a rear or auxiliary bar, one of said bars being of greater length than the other, and means for connecting the ends of said bars thereby to place the shorter bar under tension and to camber the longer bar.

2. A bumper comprising a front or impact bar and a rear or auxiliary bar, one of said bars being longer than the other and having an initial shape different from that to be assumed when assembled, and means for connecting the ends of said bars thereby to place the shorter bar under tension and to impart a camber to the longer bar.

3. A bumper comprising a substantially straight rear or auxiliary bar and an initially straight front or impact bar of greater length than the rear or auxiliary bar, and means connecting the ends of said bar, with the ends of the front or impact bar in substantial alignment with the ends of the rear or auxiliary bar whereby the former bar is cambered and the latter bar is placed under tension.

4. A bumper comprising an impact bar and a rear or auxiliary bar, the said bars being of such relative length and so connected as to create an initial bend or strain in the front or impact bar in a negative direction, with the rear or auxiliary bar under tension.

5. A bumper comprising a rear or auxiliary bar and a front or impact bar, said bars being unequal in length and at least one of said bars being substantially straight before assembling, and means connecting the ends of said bars, thereby to impart a camber to the bar of greater length and to place the other bar under tension.

6. A bumper comprising a pair of vertically spaced impact bars and a rear or auxiliary bar located substantially midway between the top of the upper impact bar and the bottom of the lower impact bar, the said impact bars being of greater length than the rear or auxiliary bar, and means connecting the ends of the rear or auxiliary bar to the ends of the front or impact bars with the corresponding ends of the bars in substantial alignment, whereby the impact bars are cambered and the rear or auxiliary bar is placed under tension.

In testimony whereof, I hereunto affix my signature.

BLADEN M. SHORT.